United States Patent [19]

Ma

[11] Patent Number: 4,975,630
[45] Date of Patent: Dec. 4, 1990

[54] CONSTANT POWER SUPPLY UNIT OF ELECTRIC HEATING APPARATUS

[76] Inventor: Gil-Pyung Ma, 918-41 Daerim 1-dong, Youngdeungop-ku, Seoul, Rep. of Korea

[21] Appl. No.: 320,746

[22] Filed: Mar. 8, 1989

[30] Foreign Application Priority Data

Jul. 26, 1988 [KR] Rep. of Korea ............... 9415/1988

[51] Int. Cl.⁵ .............................................. G05F 5/00
[52] U.S. Cl. .................................... 323/300; 323/299
[58] Field of Search ............... 323/241, 299, 300, 319, 323/322

[56] References Cited

U.S. PATENT DOCUMENTS

| 4,168,476 | 9/1979 | Petrizio | 323/300 |
| 4,687,896 | 8/1987 | Baik | 323/300 X |
| 4,689,548 | 8/1987 | Mechlenburg | 323/300 X |

FOREIGN PATENT DOCUMENTS 0229520 11/1985 Fed. Rep. of Germany ...... 323/300

Primary Examiner—Patrick R. Salce
Assistant Examiner—Kristine Peckman
Attorney, Agent, or Firm—Finnegan, Henderson, Farabow Garrett & Dunner

[57] ABSTRACT

A constant power supply unit of an electric heating apparatus is disclosed. A voltage sensing circuit generates a DC reference signal corresponding to the nominal value of an AC supply voltage. A timing pulse generator generates a rectangular waveform signal during one of every four cycles. A trigger generator generates a trigger signal at zero-cross points determined by the combination of outputs of a voltage sensing circuit and the timing pulse generator. A power control circuit controls the input power to the electric heating apparatus by the trigger signal, thereby allowing a constant power supply to the electric heating apparatus regardless of the nominal value of the AC supply voltage which may be either 220 volts or 100 volts.

1 Claim, 3 Drawing Sheets

CONSTANT POWER SUPPLY UNIT OF ELECTRIC HEATING APPARATUS

BACKGROUND OF THE INVENTION

This invention relates to a constant power supply unit of an electric heating apparatus for supplying a constant power to the electric heating apparatus regardless of the nominal value of the AC power supply voltage.

The electric heating apparatus has two nominal power supply voltages since the supply voltage supplied from an electric company is usually either 220 or 100 volts. Conventional electric heating apparatus such as a rice pot, coffee pot, etc., use a step-down transformer in order to use one of the two nominal voltages of a power supply. Nevertheless, the requirement for a transformer is not only costly but causes extra consumption of electrical power. It is practically impossible to mount the transformer inside the heating apparatus because of weight and volume constraints. Also some electric heating apparatus such as electric rice cookers that are adaptable to two nominal input voltages have two hot wires and a switch for selecting a connection of the two hot wires. When high nominal input voltage of 220 volts is supplied from an electric company, a user sets the switch so as to make a series connection of the two hot wires. When low nominal input voltage of 100 volts is supplied, the user sets the switch so as to make a parallel connection of the two hot wires or to select one of the two hot wires. The temperature distribution of the rice in the cooker is not homogenous due to the difficulty of the hot wire arrangement, thus the rice is not properly cooked. Furthermore, a fire may occur if the user sets the switch improperly.

Accordingly, a primary object of this invention is to provide a constant power supply unit for an electric heating apparatus without using expensive, heavy, and bulky transformers and without having to switch the connection between two hot wires depending on the nominal value of the AC supply voltage.

Another object of this invention is to provide a constant power supply unit which can be mounted inside the small space of an electric cooker.

A further object of the present invention is to provide a constant power supply unit of an electric heating apparatus which is safe from an electrical fire.

SUMMARY OF THE PRESENT INVENTION

These objects are achieved, by providing a constant power supply unit comprised of (a) a voltage sensing circuit which generates, respectively, a high DC reference signal when AC supply voltage has a high nominal value of 220 volts and a low DC reference signal when AC supply voltage has a low nominal value of 100 volts; (b) a timing pulse generator which generates a rectangular waveform signal during one of every four cycles of input voltage supplied from a power line; (c) a trigger generator which generates a trigger signal at zero-cross points appointed by the combination of an output signal of the voltage sensing circuit and an output signal of the timing pulse generator; and (d) a power control circuit that controls the input power supplied from the power line to the electric heating apparatus by using the trigger signal.

According to the present invention, the voltage sensing circuit detects the voltage level from the AC supply and generates a DC reference signal corresponding to that AC voltage level. The timing pulse generator converts the AC supply voltage into a rectangular waveform signal during one of every four rectangular waveform signals by dividing the converted rectangular waveform signal. A trigger generator generates a trigger signal at appointed zero-cross points of the supply voltage according to combination output signals of a voltage sensing circuit and a timing pulse generator. A power control circuit controls the input power of an electric heating apparatus by said trigger signal, thereby, allowing a constant power supply to the electric heating apparatus regardless of whether the AC supply voltage is either 220 volts or 100 volts. The interval in which the supply voltage is applied to an electric heating apparatus when the supply voltage has a nominal value of 220 volts is approximately a quarter of the interval when the supply voltage has a nominal value of 100 volts. However, the power supplied to the electric heating apparatus from a voltage of 220 volts to the electric heating apparatus is the same as that for 100 volts.

These and other objectives as well as advantages of the present invention will become clear by the following description of a preferred embodiment of the present invention with reference to the accompanying drawings.

DESCRIPTION OF THE PREFERRED EMBODIMENT

Figure 1:
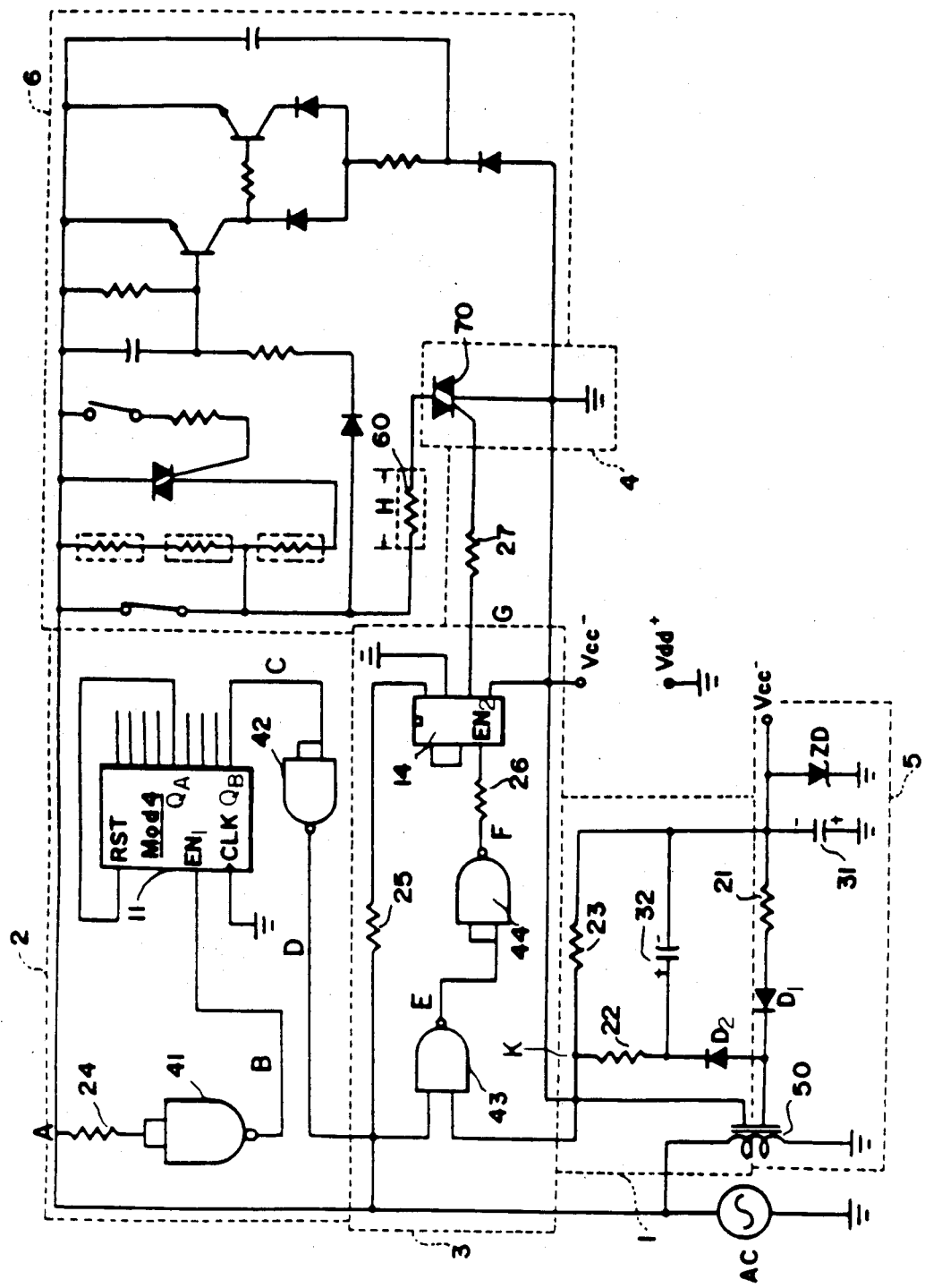
FIG. 1 is an exemplary circuit diagram of the present invention.
Figure 2:
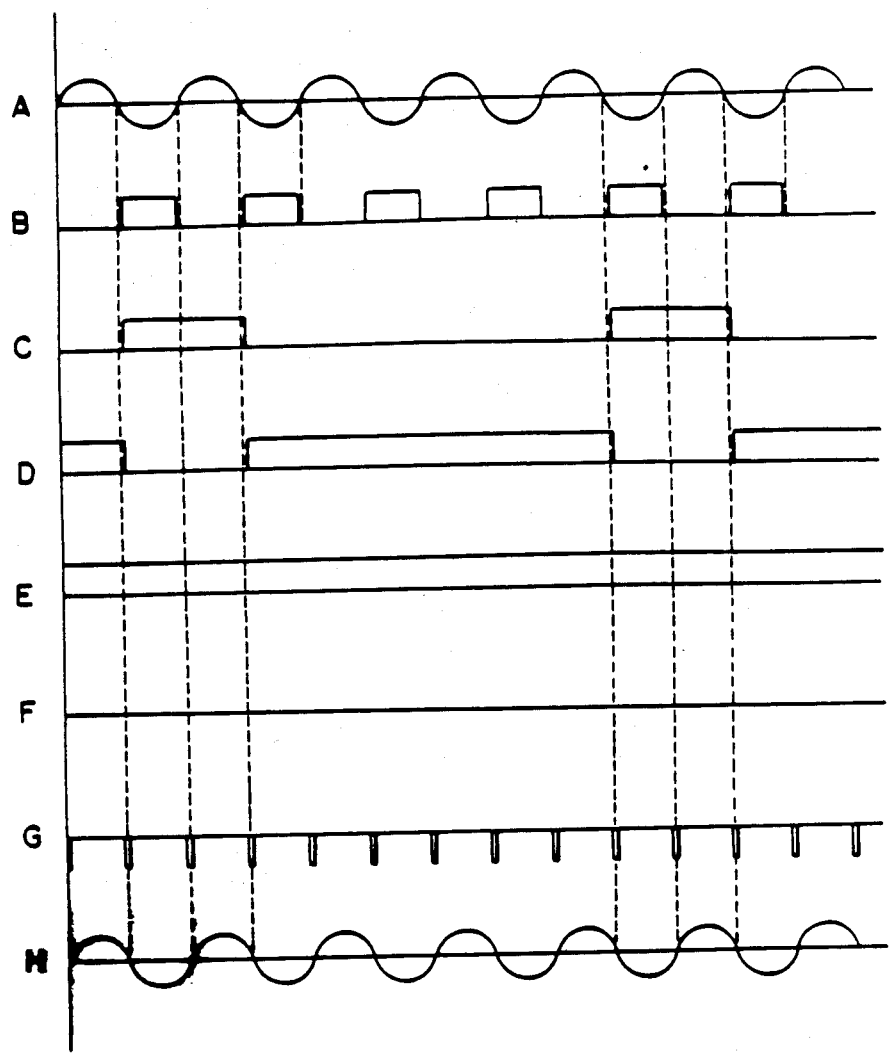
FIG. 2 shows the waveforms of signals observed at various points of the circuit of FIG. 1 when a low nominal voltage of 100 volts is inputted.
Figure 3:
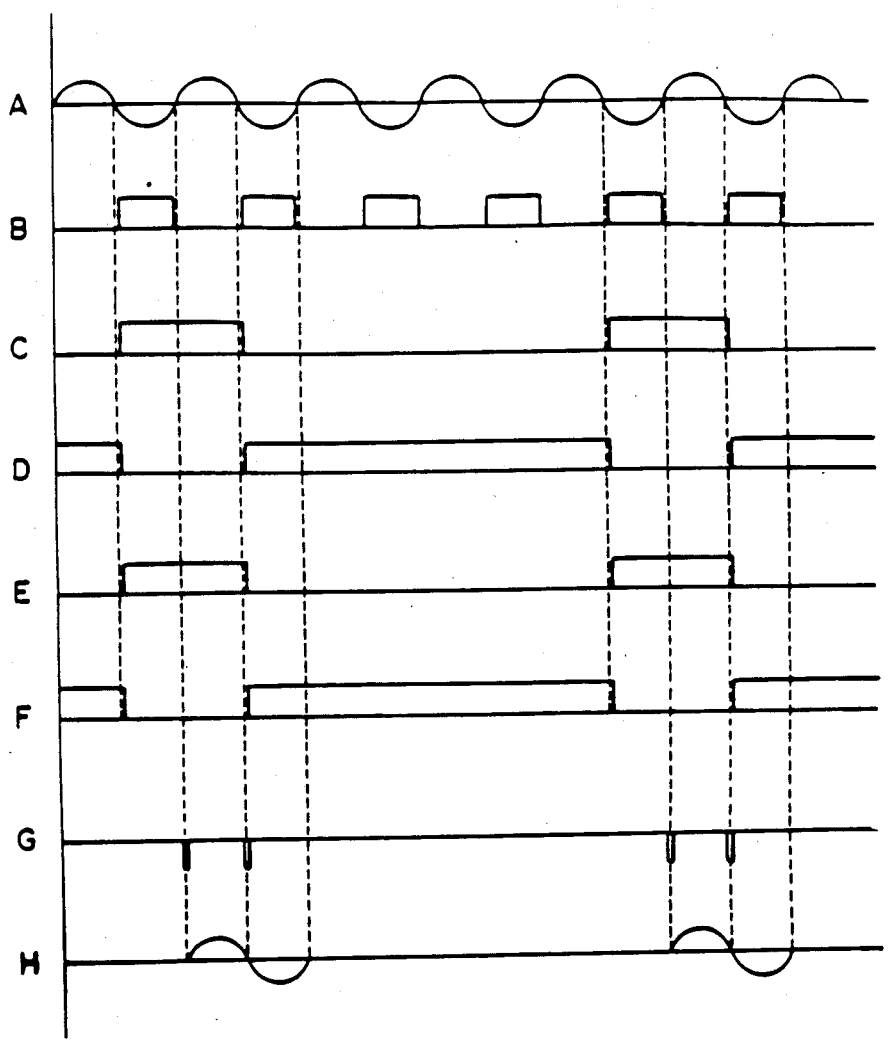
FIG. 3 shows the waveforms observed at various points of the circuit of FIG. 1 when a high nominal voltage of 220 volts is inputted.

FIG. 1 is an exemplary circuit diagram of the present invention. Conventional rectifier 5 is to obtain a negative DC supply voltage of Vcc$^-$ for IC chips. The secondary voltage of step-down transformer 50 is proportional to the AC supply voltage. However, the DC voltage of Vcc$^-$ is regulated by resistor 21 in series with the Zener diode and always limited to the Zener voltage of the Zener diode. Voltage sensing circuit 1 is to generate a low DC reference signal when the nominal value of AC supply voltage is 100 volts and a high DC reference signal when the nominal value of AC supply voltage is 220 volts. Diode D$_2$ of voltage sensing circuit 1 whose anode is connected to the secondary winding of the transformer 50 and whose cathode is connected to capacitor 32 is to charge capacitor 32 with positive voltage. A voltage divider comprised of a series combination of two resistors 22 and 23 is connected in parallel with capacitor 32. The point K in the connection of two resistors 22 and 23 is the point to obtain the DC reference signal and is connected to one input terminal of NAND gate 43. The reference signal of the point K is high when the nominal value of AC supply voltage is 220 volts and low when the nominal value of AC supply voltage 100 volts. The resistance of resistors 22 and 23 has to be so determined that said high reference signal is greater than the threshold level of input signal of NAND gate 43 and said low reference signal is less than the threshold level of input signal of NAND gate 43. Timing pulse generator 2 is to generate a rectangular waveform signal during one of every four cycles of AC supply voltage. Ring counter 11 is used as a mode-4 counter. Two input terminal of NAND gate 41 is commonly connected to resistor 24 whose other terminal is connected to an AC power line. The output signal of NAND gate 41 is applied to the enable terminal of counter 11. The output signal of counter 11 is inverted by NAND gate 42 and then applied to another two input terminal NAND gate 43. NAND gate 41 generates a positive rectangular waveform signal during a negative half cycle of AC supply voltage as shown in FIGS. 2 and 3, as line B. Counter 11 receiving the signal from NAND gate 41 generates a positive rectangular wave form signal during one of every four cycles of AC supply voltage as shown in FIGS. 2 and 3 as line C because the counter 11 is a mode-4 counter. The output waveform of inverter 42 is shown in FIGS. 2 and 3 sd line D. Trigger generator 3 is used to generate a trigger pulse at all zero-cross points of AC an supply voltage in order for the AC supply voltage to be applied to the electric heating apparatus when 100 volts is supplied from an electric company and at two zero-cross points of every four cycles when 220 volts is supplied. Each of two input terminals of NAND gate 43 is connected to NAND gate 42 and voltage divider of voltage sensing circuit 1, respectively. Because the output level of point K of voltage divider is low when AC supply voltage is 100 volts, the output signal of NAND gate 43, as shown in FIG. 2, line E, is always high regardless of the output waveform of NAND gate 42.

When AC supply voltage is 220 volts, the output signal of NAND gate 43 is the same as that of NAND gate 42, as shown in FIG. 3, line E, because of high output level of point K. The output signal of NAND gate 43 is inverted by inverter 44 whose output terminal is connected to resistor 26 connected to the enable terminal of zero-cross IC 14. This connection will make the zero-cross IC 14 generate two pulses at two zero-cross points corresponding to one of every four cycles of AC supply voltage.

When AC supply voltage is 100 volts, the input level of the enable terminal of zero-cross IC 14 is low, as shown in FIG. 2, line F, so as to always enable the IC 14. When AC supply voltage is 220 volts, then the input signal of the enable terminal of zero-cross IC 14 is low only during one of every four cycles, as shown in FIG. 3, line F. The IC 14 in the case of 220 volts is enabled during only one of each four cycles.

The input terminal of the zero-cross IC 14 is connected to AC power line through resistor 25 so that the IC 14 can generate a pulse train occurring at all zero-cross points of the AC supply voltage. However, IC 14 generates the pulse train shown in FIG. 2, line G, when AC power of 100 volts is supplied and the pulse train shown in FIG. 3, line G, when AC power of 220 volts is supplied because its enable terminal is controlled by the output of NAND gate 44.

Power control circuit 4 is to control the input power supplied to the electric heating apparatus from an AC power line. Main terminals of triac 70 are connected between two power lines in series with the electric heating wires 60 and the gate terminal of triac 70 connected to the output terminal of trigger generator 3 through resistor 27 so as to be turned on or off according to the nominal voltage of AC power supplied from an electric company.

When AC supply voltage of 100 volts is supplied from a power line, the signal applied to the gate of triac 70 is the waveform shown in FIG. 2, line G. This signal always fires the triac 70 on. Therefore, all cycles of AC supply voltage of 100 volts are transferred to the electric heating apparatus through triac 70, as shown in FIG. 2, line H.

When AC supply voltage of 220 volts is supplied from a power line, the signal applied to the gate of triac 70 is the waveform shown in FIG. 3, line G. This signal fires the triac 70 on during one of every four cycles of AC supply voltage. Therefore, one of every four cycles of AC supply voltage of 220 volts is transferred to the electric heating apparatus through triac 70.

Thus, according to the constant power supply unit of the present invention, the constant electric power is always supplied to the electric heating apparatus regardless of the nominal value of AC supply voltage.

I claim:

1. A constant power supply unit for an electric heating apparatus for supplying a constant level of power to said electric heating apparatus regardless of the nominal value of an AC supply voltage which is either 100 volts or 220 volts, comprising:
   (a) a voltage sensing circuit which generates a high/low reference DC signal according to said supply voltage;
   (b) a timing pulse generator which generates a rectangular waveform signal during one of every four cycles of said supply voltage;
   (c) a trigger generator which generates a trigger signal at zero-cross points of said supply voltage determined by a combination of output signals of said voltage sensing circuit and said timing pulse generator; and
   (d) a power control circuit which controls input power supplied to said electric heating apparatus by using said trigger signal;
   wherein said voltage sensing circuit comprises a diode whose anode is connected to a secondary winding of a step-down transformer, a capacitor whose positive terminal is connected to the cathode of said diode so said capacitor is charged by the current of said diode, and a series combination of resisters connected in parallel with said capacitor;
   said timing pulse generator comprising a first NAND gate whose two inputs are commonly connected to a power line through a resistor, a mode-4 counter whose enable terminal is connected to the output of said first NAND gate;
   a second NAND gate whose two input terminals are commonly connected to an output of said mode-4 counter;
   said trigger generator comprising a third NAND gate whose one input is connected to the output of said voltage sensing circuit and another input is connected to the output of said timing pulse generator;
   a fourth NAND gate whose two inputs are commonly connected to the output of said third NAND gate, a zero-cross IC whose enable terminal is connected to the output of said fourth NAND gate through a resistor, and whose input is connected to said power line through a resister;
   said voltage control circuit comprising a triac whose gate is connected to the output of said trigger pulse generator through a resistor and one main terminal is connected to the hot wire of said electrical heating apparatus.

* * * * *